(12) United States Patent
Tomoike (10) Patent No.: US 7,343,344 B2
(45) Date of Patent: Mar. 11, 2008

(54) ELECTRONIC PAYMENT SYSTEM USING ACCOUNTING FUNCTION IN A MOBILE COMMUNICATION NETWORK

(75) Inventor: Hiroyuki Tomoike, Tokyo (JP)

(73) Assignee: Nec Corporation, Tokyo (JP)

( * ) Notice: Subject to any disclaimer, the term of this patent is extended or adjusted under 35 U.S.C. 154(b) by 1226 days.

(21) Appl. No.: 09/921,978

(22) Filed: Aug. 6, 2001

(65) Prior Publication Data
US 2002/0017561 A1 Feb. 14, 2002

(30) Foreign Application Priority Data
Aug. 8, 2000 (JP) ............................. 2000-240096

(51) Int. Cl.
*G06Q 40/00* (2006.01)
(52) U.S. Cl. ..................... 705/39; 705/16; 705/17; 705/20
(58) Field of Classification Search ............... 705/16, 705/17, 20, 39, 35–45
See application file for complete search history.

(56) References Cited

U.S. PATENT DOCUMENTS

| 6,177,950 B1 * | 1/2001 | Robb ..................... 348/14.01 |
| 6,453,301 B1 * | 9/2002 | Niwa ........................... 705/26 |
| 6,765,470 B2 * | 7/2004 | Shinzaki ................... 340/5.52 |
| 6,868,391 B1 * | 3/2005 | Hultgren ..................... 705/26 |

FOREIGN PATENT DOCUMENTS

| GB | 2 347 257 A | 8/2000 |
| GB | 2 363 889 A | 1/2002 |
| JP | 7-231367 | 8/1995 |
| JP | 10-63740 | 3/1998 |
| JP | 10-162144 | 6/1998 |
| JP | 2000-11051 | 1/2000 |

(Continued)

OTHER PUBLICATIONS

United Kingdom Search Report dated Apr. 30, 2002.

(Continued)

*Primary Examiner*—R Weisberger
(74) *Attorney, Agent, or Firm*—McGinn IP Law Group, PLLC (57) ABSTRACT

A method of readily realizing electronic payment service at low cost with a high level of convenience and security for a consumer is disclosed. A personal information input terminal notifies a purchase price, an MSN (Mobile Subscriber Number) of an MS (Mobile Station), and personal information for identifying a purchaser through a public mobile communication network to request payment processing. A payment center device compares the information from the personal information input terminal with personal information stored in the device to determine whether the purchaser is qualified for electronic payment. If the purchaser is qualified for electronic payment, the payment center device notifies the MS of the purchase price with the MSN to request the purchaser to verify the purchase price. Upon notification from the MS that the purchase price is verified, the payment center device notifies an HLR (Home Location Register) over the public mobile communication network of the purchase price to request update of accounting information in order to collect the purchase price together with the charge for the MS. After the request for update of accounting information, the payment center device notifies a store that the electronic payment is completed.

12 Claims, 8 Drawing Sheets

FOREIGN PATENT DOCUMENTS

| | | |
|---|---|---|
| JP | 2000-132605 | 5/2000 |
| JP | 2000-163472 | 6/2000 |
| JP | 2000-165953 | 6/2000 |
| JP | 2001-6028 | 1/2001 |
| JP | 2001-351033 | 12/2001 |
| JP | 2002-32572 | 1/2002 |
| JP | 2002-42031 | 2/2002 |
| WO | WO 98/04996 | 2/1998 |
| WO | WO 98/47116 | 10/1998 |
| WO | WO 99/33034 | 7/1999 |

OTHER PUBLICATIONS

Japanese Office Action dated Aug. 25, 2004 with Partial English Translation.

A charge system for audio line use which provides support for strengthening an independent system site, Mobile Magazine, Japan, Shi-me Media Co., Ltd., Jan. 13, 2000, vol. 8, No. 2, pp. 18-19.

Akiyama, C., et al., "Providing a warning in high risk transactions, and product strengthening", Nikkei information strategies, Japan, Nikkei BP, Sep. 1998.

Yokoyama, K., "Mobile Information Communication", Nikkei Communication, Japan, Nikkei BP Co., Ltd., Jun. 5, 1995. No. 199, pp. 134-135.

* cited by examiner

ELECTRONIC PAYMENT SYSTEM USING ACCOUNTING FUNCTION IN A MOBILE COMMUNICATION NETWORK

BACKGROUND OF THE INVENTION

1. Field of the Invention

The present invention relates to an electronic payment system for electronically settling a purchase price of a commodity or the like, and more particularly to an electronic payment system for performing electronic payment on a communication network.

2. Description of the Related Art

With the widespread use of the Internet and diversified ways of life, payment means are required which are usable by typical users irrespective of time or location. Studies of methods and systems have been underway to electronically pay a purchase price of a commodity or the like. Generally, an electronic payment system intends to realize one or both of "electronified value" and "an electronified means."

The "electronified value" refers to adding value equivalent to money to electronic data such as electronic money and various kinds of prepaid cards, assuring it, and passing the data to perform payment. The "electronified means" refers to electronifying the right to acquire value or its procedure such as payment on credit, and for example, an SET (Secure Electronic Transaction) is widely known as a protocol to securely perform payment on credit on a network.

The realization of an electronic payment system facilitates consumer convenience, and offers great benefit to society such as an increase in consumption.

An electronic payment system is conventionally contemplated wherein a bank or a credit company cooperating with a communication service provider. The bank or the credit company installs a host computer for managing electronic payment to provide credit service. The communication service provider provides a communication infrastructure for connecting a store where consumers purchase commodities or the like with the host computer. A typical payment method before the system is realized with credit cards or IC cards held by consumers. Since the cards enabling purchase of commodities or the like make it unnecessary for the consumers to carry cash, the payment method is convenient, for example, when an expensive commodity is purchased.

The aforementioned prior arts, however, have the following problems.

While the conventional electronic payment system requires a bank or a credit company and a communication service provider to cooperate with each other to construct the system, the task is not easy. Since the construction of the system requires new introduction of a number of facilities, a considerably large anticipatory investment is needed.

In addition, since each credit company issues its own credit card for use in the conventional payment method and different ones of the cards can be supported by each store, a consumer often has a plurality of credit cards. A single IC card can provide a multi-function (for example, various prepaid card functions, cash card functions, and credit card functions). The IC cards, however, involve too high cost to be distributed to consumers, and thus the IC cards have not been commonplace yet. Furthermore, risk of theft or loss always exists as a problem common to both of the credit cards and IC cards.

SUMMARY OF THE INVENTION

It is an object of the present invention to provide a method and a system for readily realizing electronic payment service which offers a high degree of convenience and security to a consumer at low cost.

To achieve the aforementioned object, the present invention employs an electronic payment method for electronically settling a purchase price which a purchaser is to pay in a store.

The electronic payment system of the present invention has an MS (Mobile Station), a personal information input terminal, and a payment center device.

In the first place, a store notifies the payment center through a public mobile communication network of a purchase price, an MSN (Mobile Subscriber Number) of the MS held by a purchaser, and personal information for identifying the purchaser to request payment processing. Next, the personal information notified by the store is compared with personal information stored in the payment center to determine whether the purchaser is qualified for electronic payment.

If the purchaser is qualified for electronic payment, the MS of the purchaser is notified of the purchase price with the MSN through the public mobile communication network to request the purchaser to verify the purchase price. After the verification of the purchase price, the MS notifies the payment center of the fact. For collecting the verified purchase price together with the charge for the MS, the payment center notifies an HLR (Home Location Register) over the public mobile communication network of the purchase price to request update of accounting information. After the request of update of accounting information, the payment center notifies the store that the electronic payment is completed.

The settled purchase price is notified to the HLR over the public mobile communication network and stored in the HLR as accounting information as collectable together with the charge for the MS. Thus, the collection of the electronically settled price can be performed using existing functions of the public mobile communication network. Since the purchaser can pay a purchaser price of a commodity or the like with the MS, he need not carry a credit card or the like additionally. Since the user is authenticated with the MSN of the MS and the personal information such as his fingerprint pattern, the MS, if stolen, cannot be used by another person to purchase a commodity. The MS is called back from the public mobile communication network by using the MSN at the time of payment to allow the purchaser to make a final check of the purchase price, thereby preventing payment of an erroneous amount of money.

The MS is held by the purchaser. The personal information input terminal is provided for notifying the purchase price, the MSN of the MS, and the personal information for identifying the purchaser from the store through the public mobile communication network to request payment processing. The payment center device compares the information notified from the personal information input terminal with personal information stored in the device to determine whether the purchaser is qualified for electronic payment. If the purchaser is qualified for electronic payment, the payment center device notifies the MS of the purchase price with the MSN through the public mobile communication network to request the purchaser to verify the purchase price. Upon notification from the MS that the purchase price is verified, the payment center device notifies the HLR over the public mobile communication network of the purchase price to request update of accounting information in order to collect the verified purchase price together with the charge for the MS. After the request for update of accounting information, the payment center device notifies the store that the electronic payment is completed.

The aforementioned payment center device of the present invention may be a computer for performing an electronic payment program including processing for functions of the respective units of the payment center device. The personal information input terminal of the present invention may be an information processing device for performing an electronic payment program including processing for functions of the respective units of the personal information input terminal. These electronic payment programs can be stored on a storage medium.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
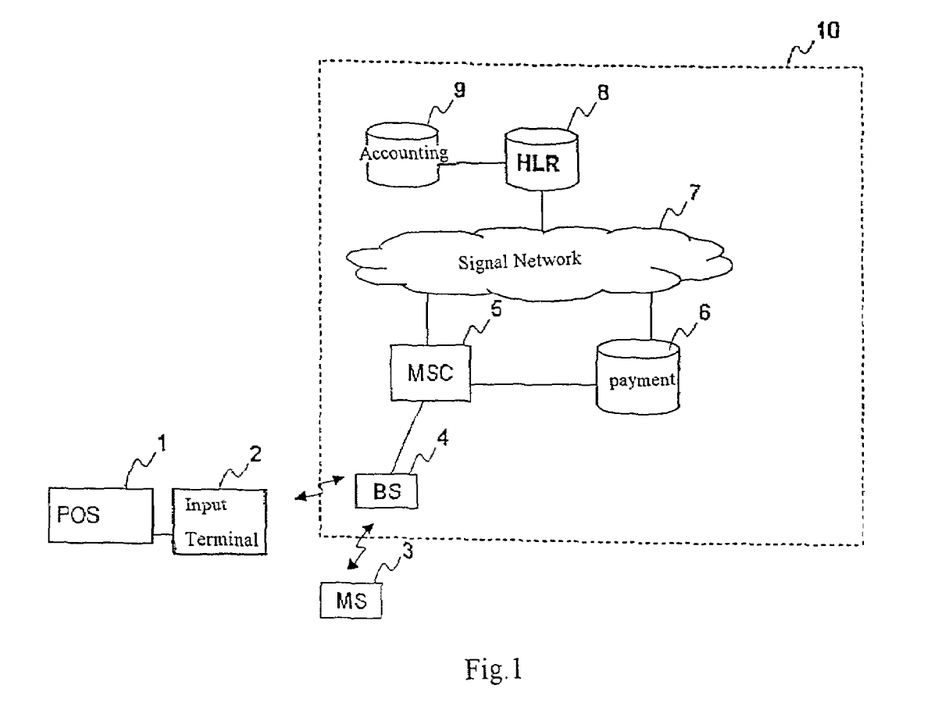
FIG. 1 is a block diagram showing a configuration of an electronic payment system according to an embodiment of the present invention.

Referring to FIG. 1, there is shown an electronic payment system according to an embodiment of the present invention comprising POS terminal 1, personal information input terminal 2, MS (Mobile Station) 3, and public mobile communication network 10. Public mobile communication network 10 is a mobile communication network provided by a communication provider and includes BS (Base Station) 4, MSC (Mobile Service Center) 5, payment center device 6, common line signal network 7, HLR (Home Location Register) 8, and accounting center device 9.

POS terminal 1 is a terminal placed in a store for allowing a salesclerk to input a price of a commodity or the like purchased by a purchaser (hereinafter referred to as "user") in the store. The input purchase price information is notified to personal information input terminal 2. Personal information input terminal 2 is registered as a terminal in public mobile communication network 10 and placed in the store similarly to POS terminal 1. In response to input of an MSN (Mobile Subscriber Number) of MS 3 of a user subscribing to mobile communication service and personal information for identifying the user such as a fingerprint pattern, personal information input terminal 2 notifies payment center device 6 of the MSN of MS 3, the personal information, and the purchase price information. While the fingerprint pattern is used as an example of the personal information, other information allowing identification of a user such as a corneal pattern and a password may be used as the personal information. While POS terminal 1 and personal information input terminal 2 are provided herein as separate devices, they may be integrated and provided as a single device.

MS 3 is a mobile station owned by a user and registered in public mobile communication network 10 for transmitting and receiving data to and from a device to be communicated with. MS 3 may be a cellular phone which can display transmitted and received information in data communications on a display. BS 4 transmits and receives radio signals to and from personal information input terminal 2 and MS 3. MSC 5 accommodates a plurality of BSs 4 to switch between MS 3 connected thereto through BS 4 and a device to be communicated with. MSC 5 has the function of performing call connection control and authentication for switching, and transmits and receives a control signal through common line signal network 7. Payment center device 6 has a database for storing MSNs and personal information such as fingerprint patterns of subscribers to the service provided by the electronic payment system. Payment center device 6 identifies a user by comparing an MSN and personal information sent from personal information input terminal 2 with the information in the database, and performs payment processing based on the purchase price information. Common line signal network 7 is a communication network for transmitting control signals between devices constituting public mobile communication network 10. HLR 8 stores subscriber information such as MSNs assigned to personal information input terminal 2 and a mobile terminal such as MS 3, MSIs (Mobile Station Identifier), and authentication key information, and manages the subscribers to the mobile communication service. Accounting center device 9 periodically collects from HLR 8 bill information which is information of charge for each subscriber whose information is stored in HLR 8, and issues a bill to collect a charge from each subscriber.

Figure 2:
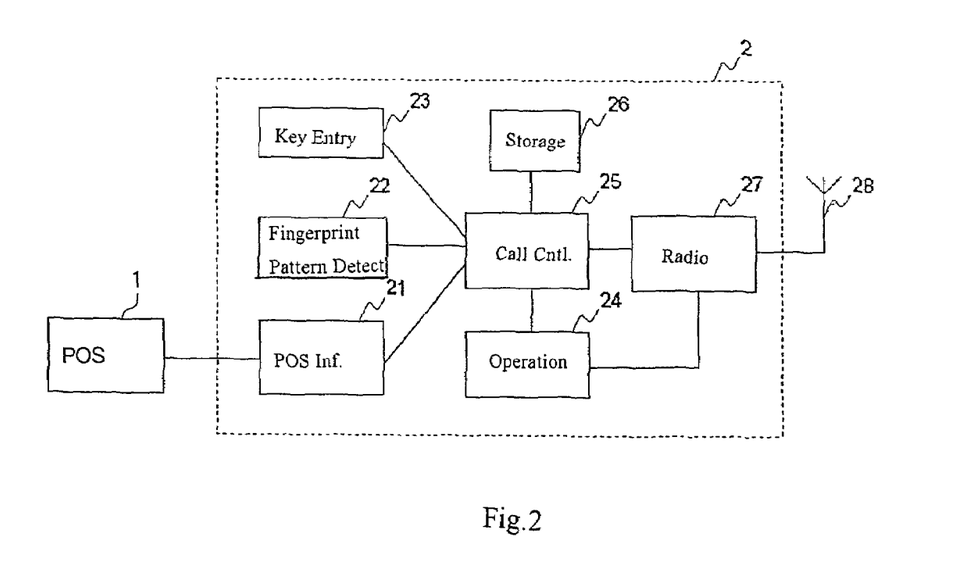
FIG. 2 is a block diagram showing an exemplary configuration of a personal information input terminal in the electronic payment system in FIG. 1.

Referring to FIG. 2, personal information input terminal 2 comprises POS interface unit 21, fingerprint detecting unit 22, key entry unit 23, operation unit 24, call control unit 25, storage unit 26, radio control unit 27, and antenna 28.

POS interface unit 21 is an interface for communication with POS terminal 1 and receives purchase price information from POS terminal 1. Fingerprint detecting unit 22 detects the fingerprint pattern of a user as personal information. Key entry unit 23 detects the MSN of MS 3 and the like input thereto through key operations. Operation unit 24 performs an operation for authentication performed between personal information input terminal 2 and MSC 5. Call control unit 25 performs processing for call connection between personal information input terminal 2 and MSC 5, and sends the MSN of MS 3, personal information, and purchase price information to payment center device 6 for payment processing. Storage unit 26 is a memory such as a ROM (Read Only Memory) for storing the MSN, MSI, and authentication key of personal information input terminal 2. Radio control unit 27 controls transmission and reception of various signals in a wireless path between personal information input terminal 2 and BS 4.

Figure 3:
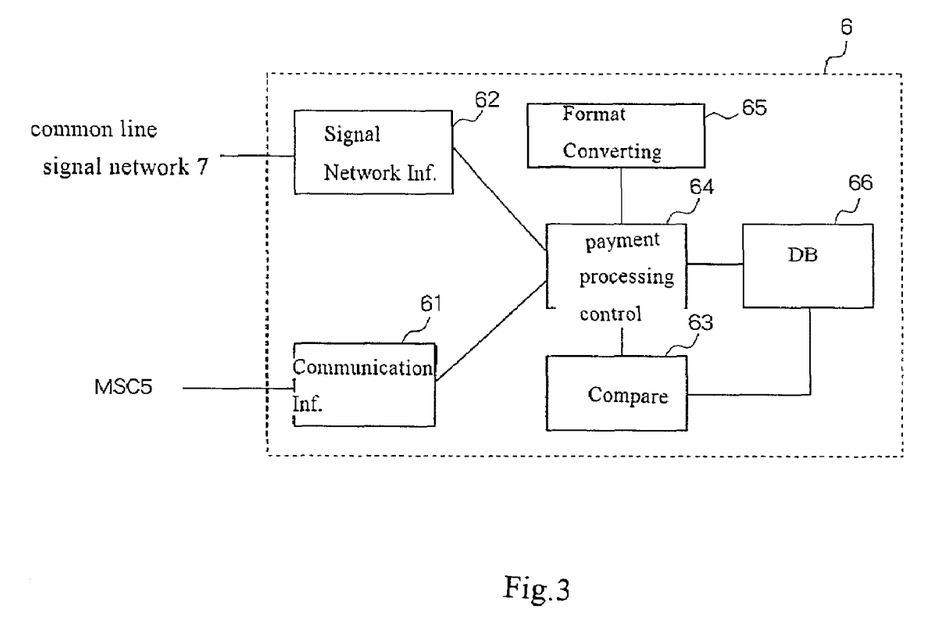
FIG. 3 is a block diagram showing an exemplary configuration of payment center device in the electronic payment system in FIG. 1.

Referring to FIG. 3, payment center device 6 comprises communication interface unit 61, common line signal network interface unit 62, comparing unit 63, payment processing control unit 64, bill format converting unit 65, and personal information DB (database) unit 66.

Communication interface unit 61 is an interface for transmitting and receiving signals to and from MSC 5. Common line signal network interface unit 62 is an interface for transmitting and receiving control signals to and from MSC 5 and HLR 8 through common line signal network 7. Comparing unit 63 compares the fingerprint pattern sent from personal information input terminal 2 with ones stored in personal information DB unit 66. Payment processing control unit 64 controls payment processing in payment center device 6. Bill format converting unit 65 converts the price information passed in payment processing into one in a bill format which is an accounting information format unique to public mobile communication network 10. Personal information DB unit 66 is a database for storing information such as an MSN of MSN 3 or a fingerprint pattern of each user subscribing to the service of the electronic payment system.

The operation of the electronic payment system of the embodiment will be now described. It should be noted that, in sequences shown in FIGS. 4 to 7, description of well-known operations irrelevant to the feature of the present invention is omitted such as control of radio channels by BS 4, and BS 4 is shown with MSC 5. Typically, public mobile communication network 10 has a plurality of MSCs 5 and a signal is transferred to a desired destination through a plurality of MSCs 5. This is, however, irrelevant to the main points of the present invention, and thus only one MSC 5 is shown. In addition, while a control signal associated with MSC 5, payment center device 6, and HLR 8 in public mobile communication network 10 is transmitted to a desired destination over common line signal network 7, this is irrelevant to the main portions of the present invention, and thus description of common line signal network 7 is omitted.

Figure 4:
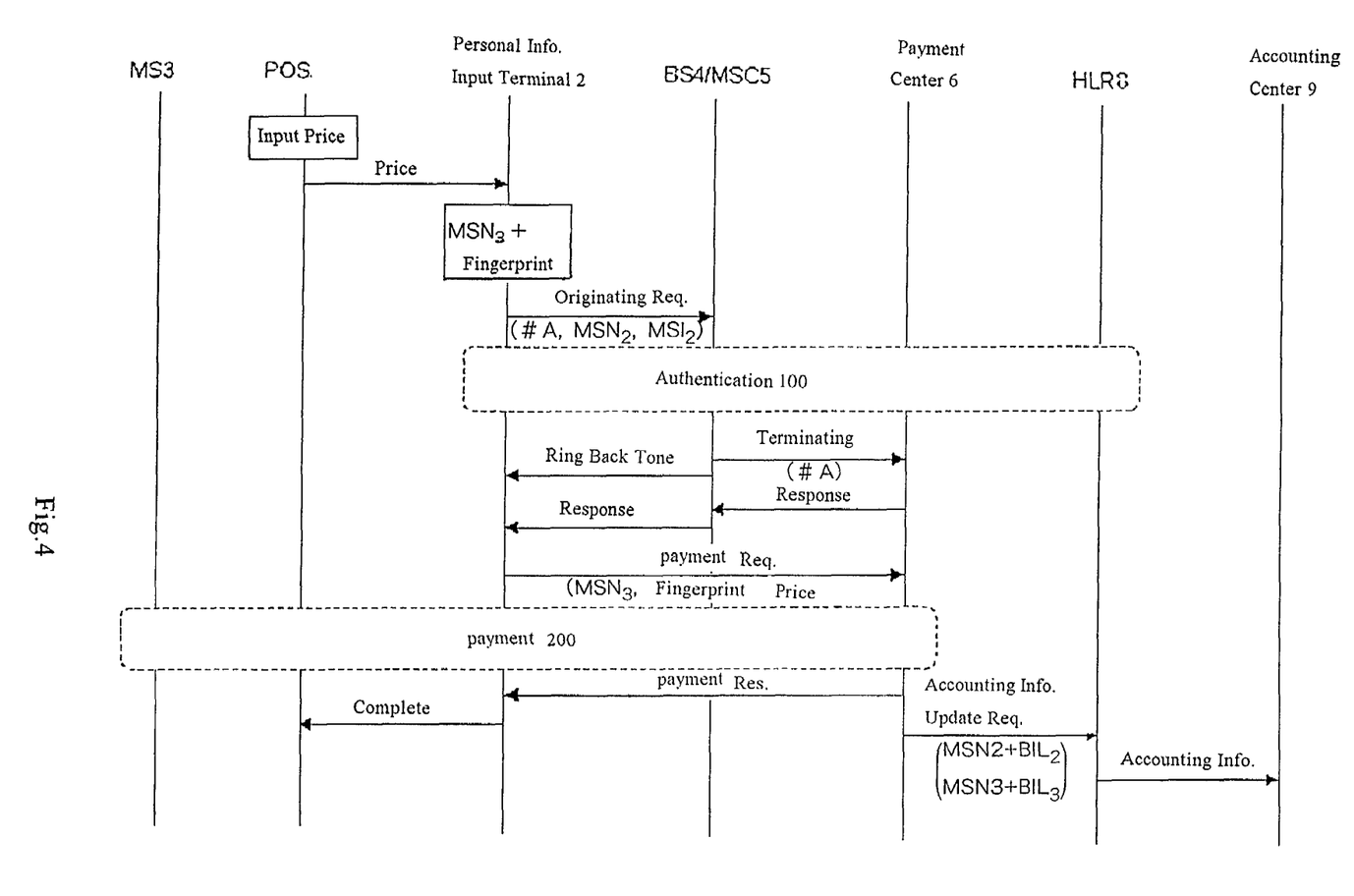
FIG. 4 shows a sequence illustrating exemplary operations of the electronic payment system of the embodiment.

In FIG. 4, when a user holding MS 3 and subscribing to the service of the electronic payment system purchases a commodity in a store having POS terminal 1 and personal information input terminal 2 and supports the service of the electronic payment system, the purchase price of the commodity is entered to POS terminal 1 through key entry or bar code input operations by a salesclerk.

POS terminal 1 to which the purchase price was entered notifies personal information input terminal 2 of the purchase price. After check of the purchase price, the user enters the MSN (MSN 3) of MS 3 through operations of key entry unit 23 and inputs his fingerprint pattern by putting his finger on fingerprint detecting unit 22. Personal information input terminal 2 receives the purchase price from POS terminal 1 at POS interface unit 21, and in response to detection of the MSN (MSN 3) of MS 3 and the fingerprint pattern at key entry unit 23 and fingerprint detecting unit 22, respectively, transmits a originating request signal to MSC 5 through BS 4 for connection to payment center device 6. The originating request signal includes the address (#A) of payment center device 6 as called party information as well as the MSN (MSN 2) and the MSI (MSI 2) of personal information input terminal 2 as calling party information.

Personal information input terminal authentication procedure 100 is a well-known procedure performed when public mobile communication network 10 receives a originating request for validating MS (personal information input terminal 2 in this case) which made the originating request.

Figure 5:
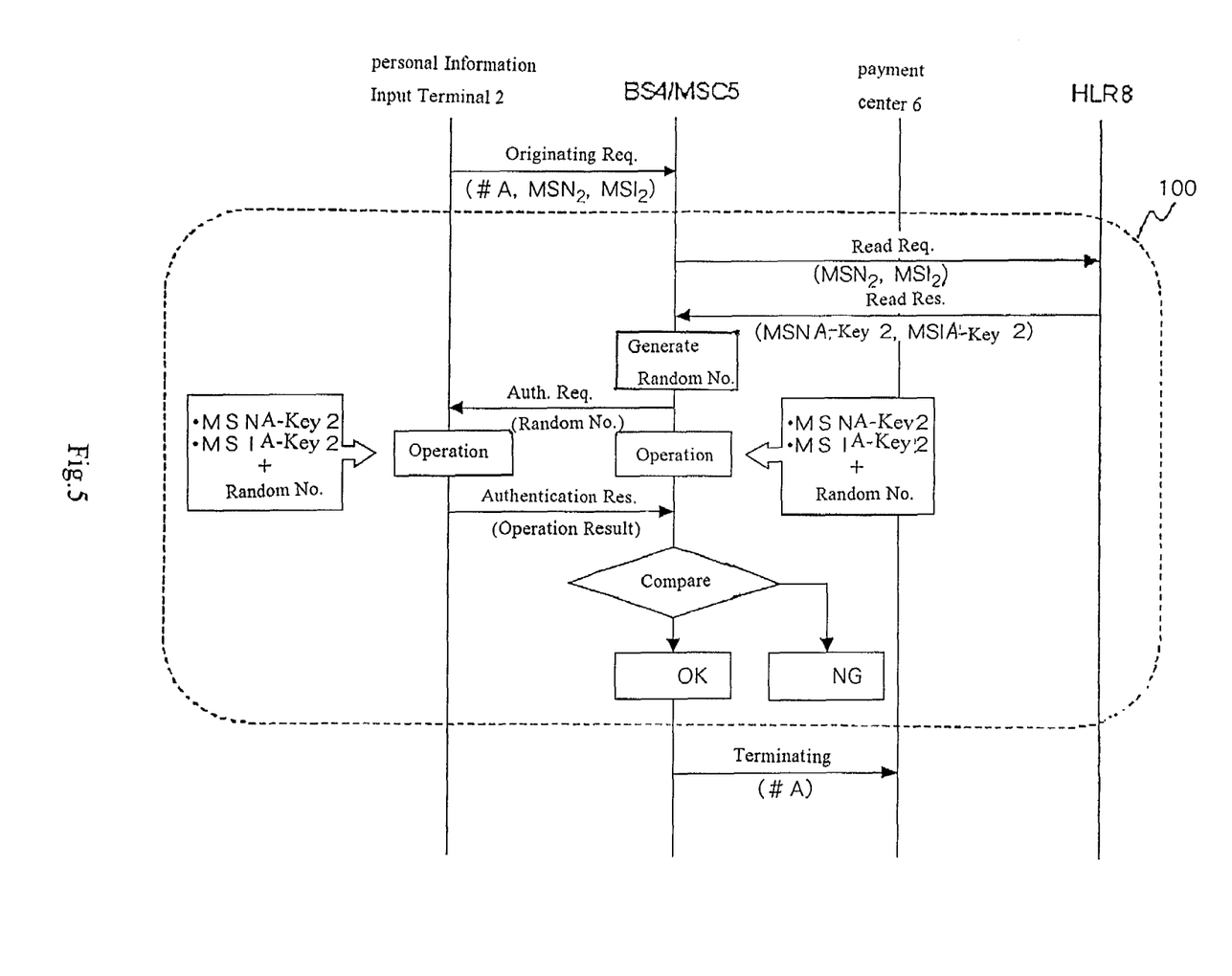
FIG. 5 shows a sequence illustrating personal information input terminal authentication procedure 100 in FIG. 4.

In personal information input terminal authentication procedure 100 in FIG. 5, MSC 5 which received the transmission request signal acquires authentication keys associated with MSN 2 and MSI 2 from HLR 8 and transmits an authentication request signal including a random number created in accordance with a predetermined algorithm to personal information input terminal 2. Personal information input terminal 2 performs a predetermined operation with its own authentication key and the random number sent in the authentication request signal from MSC 5 and transmits the operation result in an authentication response signal to MSC 5. MSC 5 compares the operation result received from personal information input terminal 2 with the result of an operation performed by itself. If the results match, MSC 5 regards the authentication as achieved to continue the originating operation to payment center device 6. If the results do not match, MSC 5 regards the authentication as unachieved to forcefully give up the originating operation from personal information input terminal 2 to payment center device 6.

After the validation of personal information input terminal 2 through personal information input terminal authentication procedure 100, MSC 5 transmits a terminating signal to call payment center device 6, and transmits ring back tone to personal information input terminal 2 to notify a salesclerk of the calling. When payment center device 6 responds thereto, a response signal is sent to personal information input terminal 2 through MSC 5.

Personal information input terminal 2 which has made sure of the establishment of a path to payment center device 6 by receiving the response signal transmits a payment processing request signal to payment center device 6 on the path. The payment processing request signal includes MSN 3, fingerprint pattern 3, and the purchase price information. This causes payment procedure 200 to be started.

Figure 6:
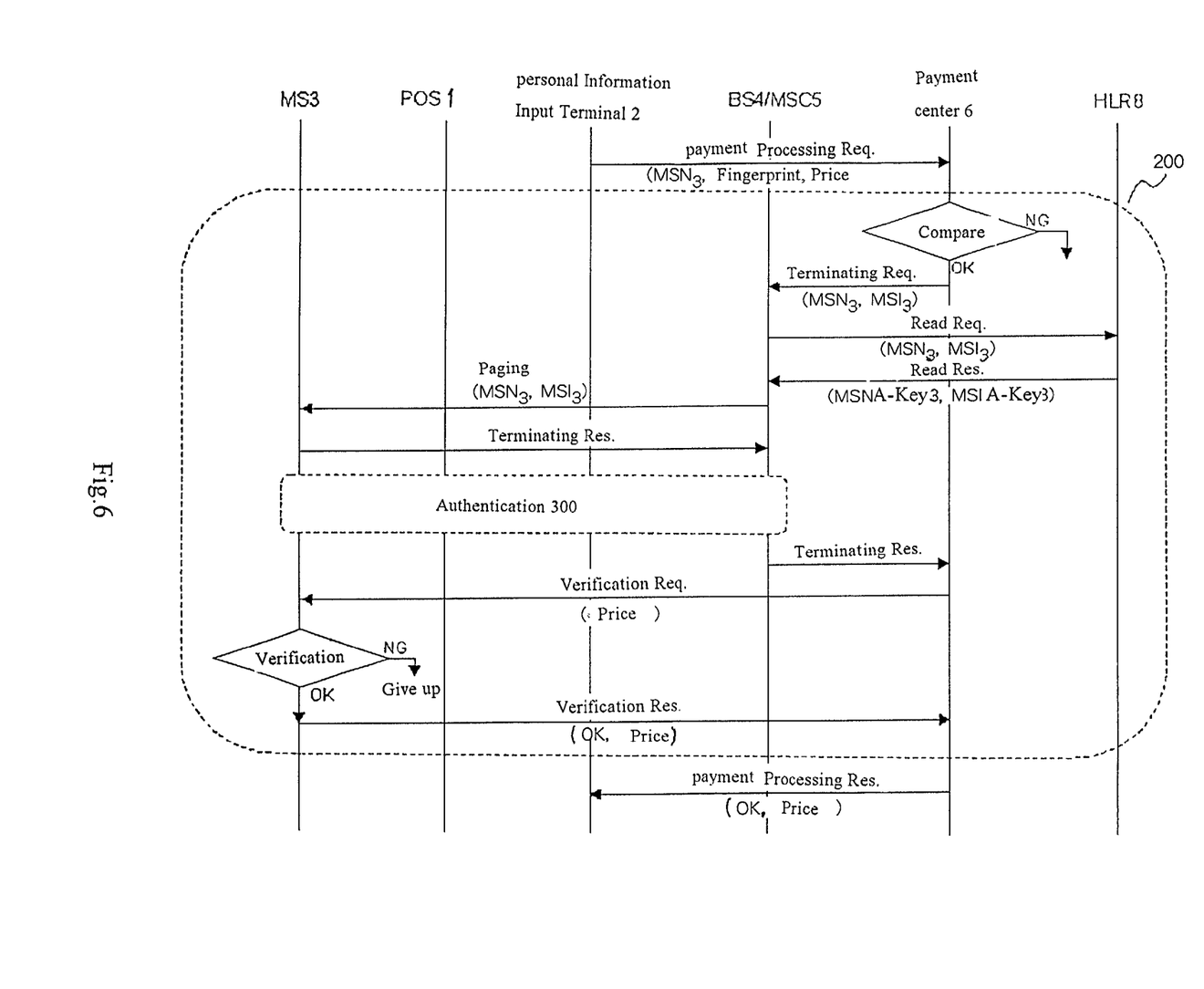
FIG. 6 shows a sequence illustrating payment procedure 200 in FIG. 4.

In payment procedure 200 in FIG. 6, payment center device 6 receives the payment processing request signal at communication interface unit 61, and retrieves the fingerprint pattern associated with MSN 3 included in the payment processing request signal by payment processing control unit 64 from personal information DB unit 66.

Comparing unit 63 compares fingerprint pattern 3 included in the payment processing request signal received from personal information input terminal 2 with the fingerprint pattern retrieved from personal information DB unit 66 to notify payment processing control unit 64 of the comparison result indicating whether they match or not.

Payment processing control unit 64 which received the comparison result from comparing unit 63 transmits a terminating request signal to MSC 5 for requesting MS 3 to receive a call if the fingerprint patterns match. The terminating request signal includes MSN 3 and MSI 3.

MSC 5 which received the terminating request signal from payment center device 6 transmits a terminating information read request signal to HLR 8. The terminating information read request signal includes MSN 3 and MSI 3 received from payment center device 6. HLR 8 which received the terminating information read request signal from MSC 5 searches its own database with MSN 3 and MSI 3. HLR 8 acquires authentication keys (MSN authentication key 3 and MSI authentication key 3) associated with MSN 3 and MSI 3 and information on location indicating an area where MS 3 exists, and transmits the information to MSN 5 in a terminating information read response signal.

MSN 5 which received the terminating information read response signal from HLR 8 transmits a paging signal through BS 4. The paging signal includes MSI 3. MS 3 which received the paging signal from public mobile communication network 10 responds to MSN 5 with a terminating response signal.

MS authentication procedure 300 is a well-known procedure performed when public mobile communication network 10 receives a reception response for validating a MS (MS 3 in this case) which made the reception response.

Figure 7:
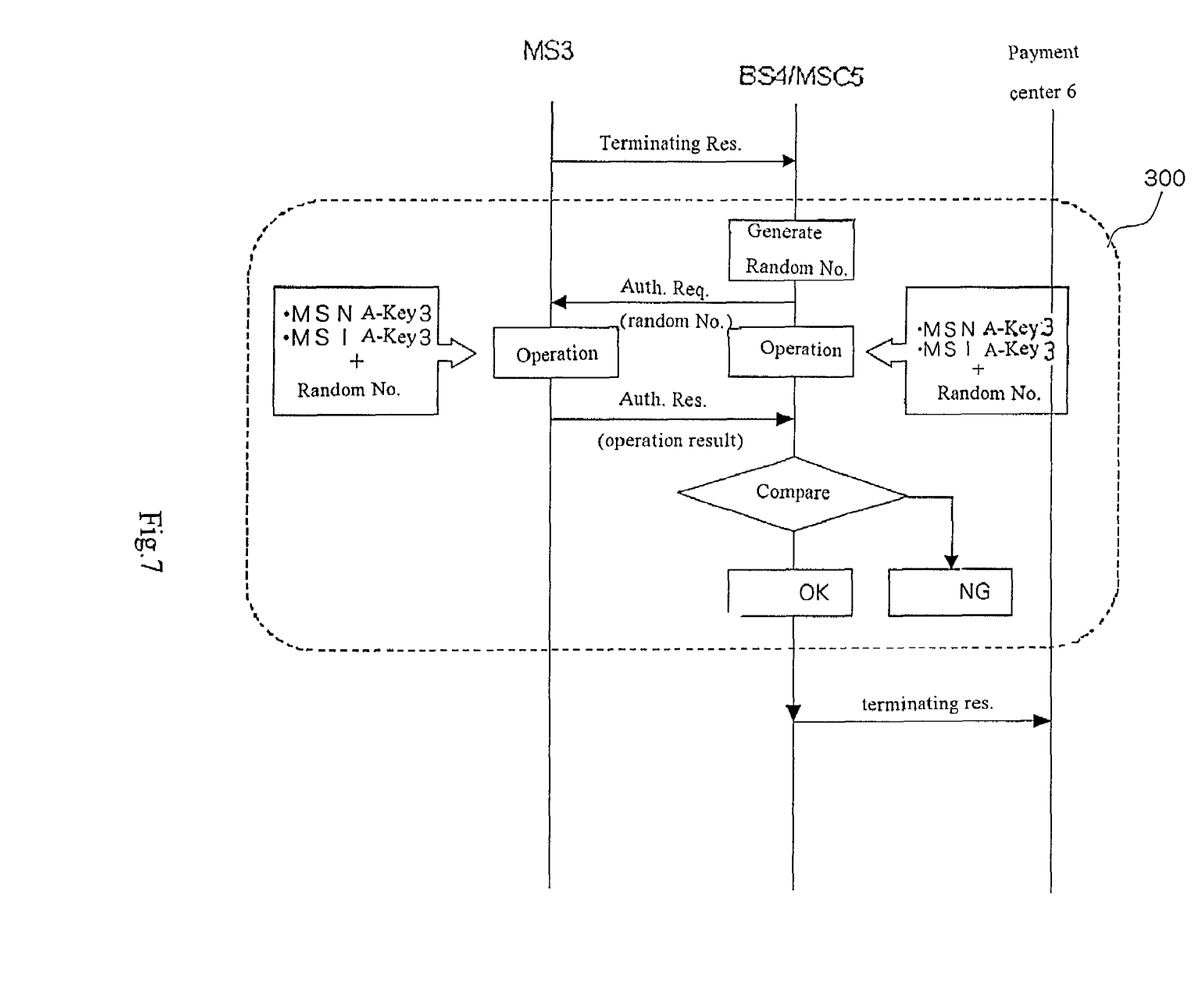
FIG. 7 shows a sequence illustrating MS authentication procedure 300 in payment procedure 200 in FIG. 6.

In MS authentication procedure 300 in FIG. 7, MSC 5 which received the terminating response signal transmits to MS 3 an authentication request signal including a random number created in accordance with a predetermined algorithm. MS 3 performs a predetermined operation with its own authentication key and the random number sent from MSC 5 in the authentication request signal and transmits the operation result in an authentication response signal to MSC 5. MSC 5 compares the operation result received from MS 3 with the result of an operation performed by itself. If they match, MSC 5 regards the authentication as achieved and transmits a terminating response to payment center device 6 to connect a path between payment center device 6 and MS 3. If they do not match, MSC 5 regards the authentication as unachieved and gives up the reception operation.

Upon reception of the terminating response signal from MSC 5, payment center device 6 which has made sure of the establishment of the path to MS 3 transmits a payment verification request signal on the established path to MS 3. The payment verification request signal includes the purchase price information. At this point, payment center device 6 may include other information such as a store ID representing the store where the user purchased the commodity and the name of the purchased commodity in the payment verification request signal sent to MS 3. In this case, the name of the purchased commodity is sent in addition to the purchase price when POS terminal 1 notifies personal information input terminal 2 of the price, while the store ID, the name of the purchased commodity and the like are sent in addition to the purchase price in the payment processing request signal which personal information input terminal 2 sends to payment center device 6.

MS 3 which received the payment verification request signal displays the purchase price on the display. When the user checks the purchase price shown on the display to make entries indicating that the payment is allowed or not through key operations to MS 3, MS 3 transmits a payment verification response signal to payment center device 6. The payment verification response signal includes the information indicating the payment is allowed or not and the purchase price information.

Payment center device 6 which received the payment verification response signal transmits a payment processing response signal to personal information input terminal 2 if the signal indicates the payment allowed. The payment processing response signal includes MSN 3, the purchase price information, and the information indicating the payment allowed. Personal information input terminal 2 which received the payment processing response signal from payment center device 6 notifies POS terminal 1 that the payment is completed in a payment notification.

Payment center device 6 also transmits a payment processing response signal to personal information input terminal 2 if the payment is not allowed. The payment processing response signal in this case, however, includes information indicating that the payment is not allowed. Then, the payment processing is given up.

Payment center device 6 which transmitted the payment processing response signal including the information indicating the payment allowed converts the purchase price information into one in a bill format unique to public mobile communication network 10 in bill format converting unit 65. Thereafter, payment center device 6 transmits an accounting information update request signal to HLR 8. The accounting information update request signal includes MSN 2, bill information (BIL 2) for personal information input terminal 2, MSN 3, and bill information (BIL 3) for MS 3.

HLR 8 which received the accounting information update request signal from payment center device 6 updates accounting information stored therein associated with personal information input terminal 2 and MS 3. The accounting information stored in HLR 8 is collected in accounting center device 9. The accounting information is used to perform processing of collection of the telephone charge and the purchase price from the user holding MS 3, processing of collection of the telephone charge from the store holding personal information input terminal 2, and processing of payment of the purchase price to the store holding personal information input terminal 2. The processing of collecting accounting information in accounting center device 9 need not be performed in synchronization with the other series of processing.

According to the electronic payment system of the embodiment, the information on the settled price is converted into one in the bill format unique to public mobile communication network 10 in payment center device 6, sent to HLR 8 on public mobile communication network 10, and stored in HLR 8 as the accounting information. Accounting center device 9 collects the accounting information to perform the processing of collecting the purchase price from the user and the processing of payment to the store. Thus, the electronic payment can be performed using existing functions of public mobile communication network 10 and the electronic payment system can be constructed at low cost without newly constructing large facilities. Since the user can pay the price of the purchased commodity with MS 3, he need not carry a credit card or the like additionally and a higher level of convenience is provided. Since the user is authenticated with the MSN of MS 3 and the fingerprint pattern, MS 3, if stolen, cannot be used by another person to purchase a commodity, thereby achieving a high level of security. In the electronic payment system, MS 3 is called back from public mobile communication network 10 at the time of payment to allow the user to make a final check of the purchase price, thereby preventing payment of an erroneous amount of money in payment center device 6.

Figure 8:
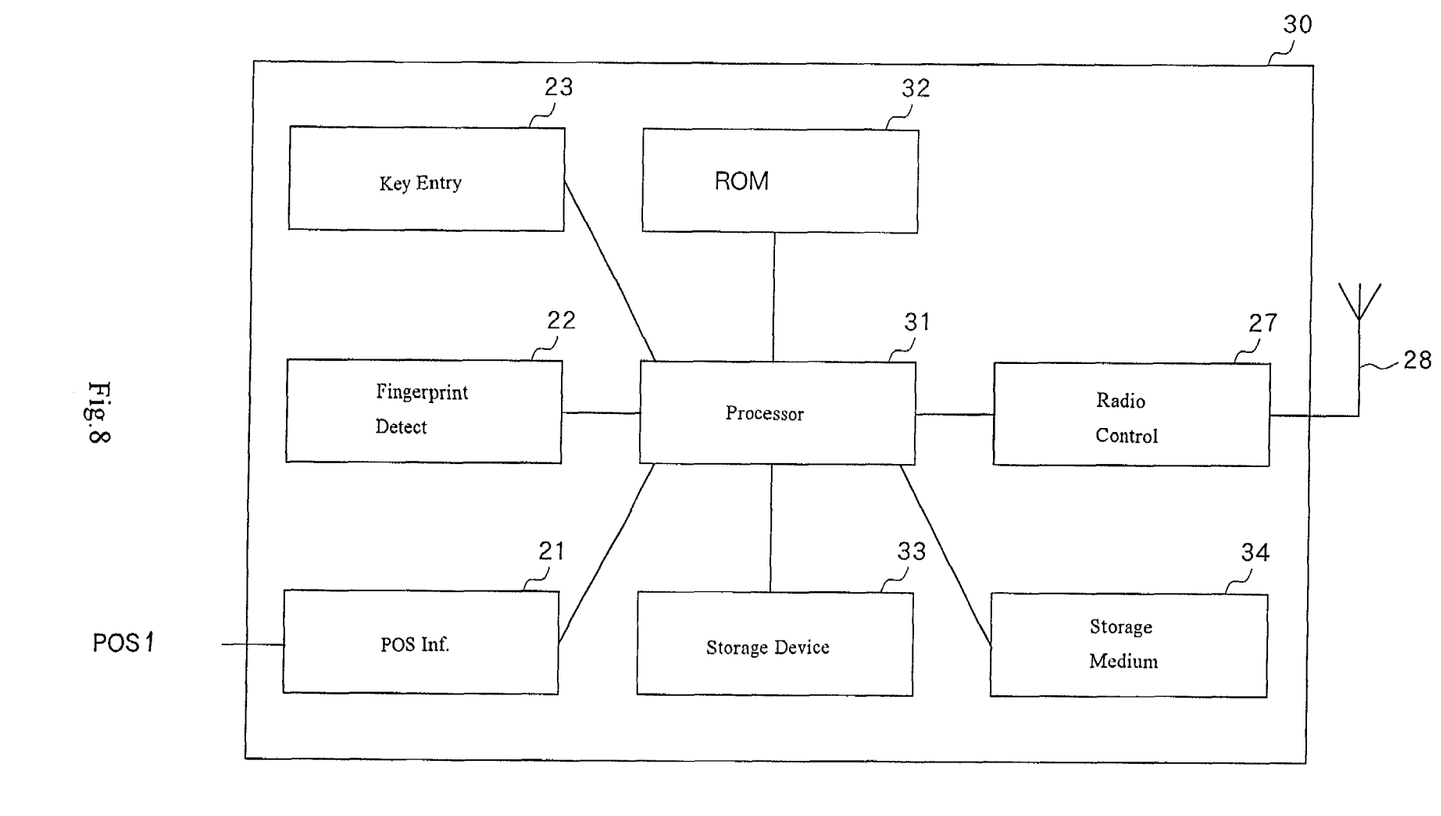
FIG. 8 is a block diagram showing a configuration of a personal information input terminal of an electronic payment system according to another embodiment of the present invention.

An electronic payment system according to another embodiment of the present invention has personal information input terminal 30 instead of personal information input terminal 2 of the electronic payment system in FIG. 1.

Referring to FIG. 8, personal information input terminal 30 comprises POS interface unit 21, fingerprint detecting unit 22, key entry unit 23, radio control unit 27, antenna 28, processor 31, ROM storage unit 32, storage device 33, and storage medium 34.

POS interface unit 21, fingerprint detecting unit 22, key entry unit 23, radio control unit 27, and antenna 28 are identical to those in FIG. 2. ROM storage unit 32 has the same function as storage device 26 in FIG. 2. Storage medium 34 is a storage medium such as a floppy disk, CD-ROM, or magneto-optical disk, and has a program stored therein for processing of call control unit 25 and operational unit 24 in FIG. 2. Processor 31 reads the program from storage medium 34 and stores it in storage device 33 before execution.

Figure 9:
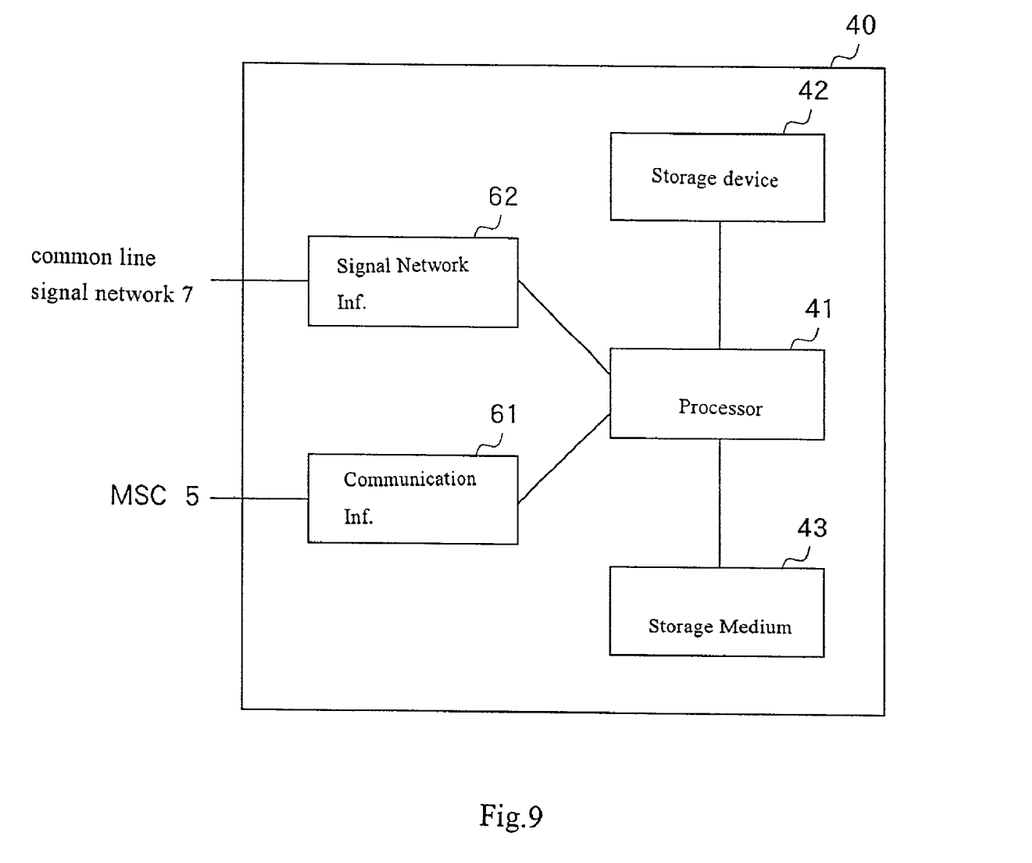
FIG. 9 is a block diagram showing a configuration of a payment center device of an electronic payment system according to yet another embodiment of the present invention.

An electronic payment system according to another embodiment of the present invention has payment center device 40 instead of payment center device 6 of the electronic payment system in FIG. 1.

Referring to FIG. 9, payment center device 40 comprises communication interface control unit 61, common line signal network interface unit 62, processor 41, storage device 42, and storage medium 43.

Communication interface control unit 61 and common line signal network interface unit 62 are identical to those in FIG. 3. Storage device 42 has information previously stored in personal information DB storage unit 66 shown in FIG. 3. Storage medium 43 is a storage medium such as a floppy disk, CD-ROM, or magneto-optic disk, and has a program stored therein for processing of payment processing control unit 64, comparing unit 63, and bill format converting unit 65 in FIG. 3. Processor 41 reads the program from storage medium 43 and stores it in storage device 42 before execution.

While preferred embodiments of the present invention have been described using specific terms, such description is for illustrative purposes only, and it is to be understood that changes and variations may be made without departing from the spirit or scope of the following claims.

What is claimed is:

1. A method of electronically settling a purchase price to be paid by a purchaser in a store in an electronic payment system comprising a mobile station held and operated by said purchaser, a personal information input terminal in the store, and a payment center, the method:
   at the personal information input terminal:
      notifying the payment center, by the store personal information input terminal through a public mobile communication network, of the purchase price, a mobile subscriber number of the mobile station held by the purchaser, and personal information for identifying the purchaser to request payment processing;
   at the payment center:
      comparing the personal information notified by the store personal information input terminal with personal information stored in the payment center to determine whether the purchaser is eligible for the electronic payment; and
      if the purchaser is qualified for the electronic payment, notifying the mobile station held and operated by the purchaser of the purchase price with the mobile subscriber number through the public mobile communication network to request the purchaser to verify the purchase price;
   at the mobile station:
      when the purchase price is verified, notifying the payment center of the fact;
      notifying a home location register over the public mobile communication network by the payment center of the purchase price to request update of accounting information in order to collect the verified purchase price together with a charge for the mobile station; and
      notifying the store by the payment center that the electronic payment has been completed after the request for update of the accounting information.

2. The method according to claim 1, wherein the personal information is a fingerprint pattern.

3. An electronic payment system for electronically settling a purchase price to be paid by a purchaser in a store, the system comprising:

a mobile station held by the purchaser;

a personal information input terminal in the store for notifying the purchase price, a mobile subscriber number of the mobile station, and personal information for identifying the purchaser from the store personal information input terminal through a public mobile communication network to request payment processing; and a payment center for comparing the personal information notified by the personal information input terminal with personal information stored in the payment center to determine whether the purchaser is eligible for the electronic payment, and if the purchaser is eligible for the electronic payment, for notifying the mobile station of the purchase price with the mobile subscriber number through the public mobile communication network to request the purchaser to verify the purchase price, and when the payment center receives a notification from the mobile station that the purchase price is verified, for notifying a home location register over the public mobile communication network of the purchase price to request update of accounting information in order to collect the verified purchase price together with a charge for the mobile station, and then notifying the store that the electronic payment has been completed.

4. The system according to claim 3, wherein the personal information is a fingerprint pattern.

5. A payment center device for electronically settling a purchase price to be paid by a purchaser in a store, the device comprising:

a personal information database for storing personal information to identify the purchaser;

comparing means for receiving and comparing personal information notified by the store with the personal information stored in the personal information database to determine whether the purchaser is eligible for the electronic payment;

bill format converting means for converting information on the purchase price into accounting information in a format unique to a public mobile communication network connectable to a mobile station held by the purchaser; and payment processing control means for notifying the mobile station of the purchase price through the public mobile communication network to request the purchaser to verify the purchase price if the comparing means determines that the purchaser is eligible for the electronic payment in response to notification of the purchase price, a mobile subscriber number of the mobile station, and the personal information from the store through the public mobile communication network to request payment processing, and upon receipt of notification from the mobile station that the purchase price is verified, for notifying a home location register over the public mobile communication network of the purchase price to request update of accounting information in order to collect the verified purchase price together with a charge for the mobile station, the purchase price being converted by the bill format converting means into accounting information in the format unique to the public mobile communication network, and then notifying the store that the electronic payment is completed.

6. The payment center device according to claim 5, wherein the personal information is a fingerprint pattern.

7. A personal information input terminal for requesting payment of a payment center for electronically settling a purchase price to be paid by a purchaser in a store, the terminal comprising:
- point-of-sale interface means for receiving notification of the purchase price from a point-of-sale terminal to which the purchase price is entered;
- entry means for entering a mobile subscriber number of a mobile station held by the purchaser;
- personal information detecting means for detecting personal information for identifying the purchaser; and
- control means for notifying the payment center through a public mobile communication network connectable to the mobile station of the purchase price received from the point-of-sale terminal through the point-of-sale interface means, the mobile subscriber number entered through the entry means, and the personal information detected by the personal information detecting means to request payment processing.

8. The personal information input terminal according to claim 7, wherein the personal information is a fingerprint pattern.

9. A computer-readable medium encoded with a computer program for enabling a computer to perform electronic payment of a purchase price to be paid by a purchaser in a store, the program comprising:
- a first set of instructions for comparing personal information notified by the store with personal information stored in a database to determine whether the purchaser is qualified for the electronic payment;
- a second set of instructions for converting information on the purchase price into accounting information in a format unique to a public mobile communication network connectable to a mobile station held by the purchaser; and
- a third set of instructions for notifying the mobile station of the purchase price through the public mobile communication network to request the purchaser to verify the purchase price if the purchaser is qualified for the electronic payment in response to notification of the purchase price, a mobile subscriber number of the mobile station, and the personal information from the store through the public mobile communication network to request payment processing, and upon receipt of notification from the mobile station that the purchase price is verified, notifying a home location register over the public mobile communication network of the purchase price to request update of accounting information in order to collect the verified purchase price together with a charge for the mobile station, the purchase price being converted into accounting information in a format unique to the public mobile communication network, and after the request for update of the accounting information, notifying the store that the electronic payment is completed.

10. A computer-readable medium encoded with a computer program for enabling a computer to perform a payment request to an electronic payment center for electronically settling a purchase price to be paid by a purchaser in a store, the program comprising:
- a first set of instructions for receiving information input to a point-of-sale terminal to extract the purchase price from the information;
- a second set of instructions for detecting an input a mobile subscriber number of a mobile station held by the purchaser;
- a third set of instructions for detecting input personal information for identifying the purchaser; and
- a fourth set of instructions for notifying the payment center through a public mobile communication network connectable to the mobile station of the purchase price, the mobile subscriber number, and the personal information to request payment processing.

11. The program according to claim 9, wherein the personal information is a fingerprint pattern.

12. The program according to claim 10, wherein the personal information is a fingerprint pattern.

* * * * *